R. C. GROH.
MOVING PICTURE MACHINE.
APPLICATION FILED AUG. 30, 1913.
1,113,617.
Patented Oct. 13, 1914.
2 SHEETS—SHEET 1.
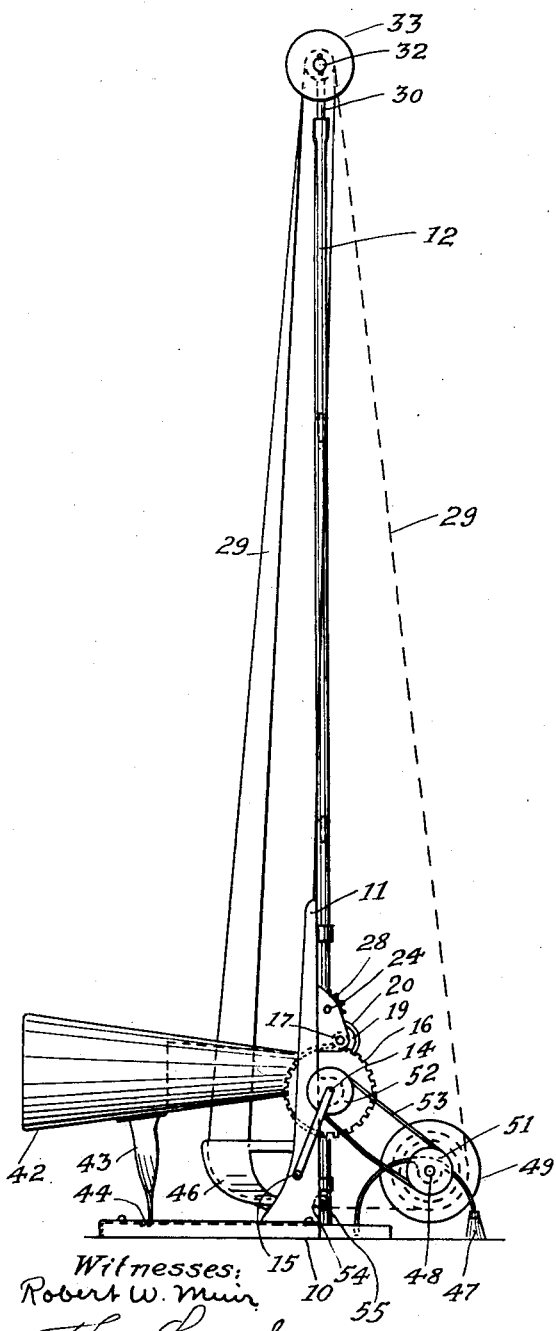
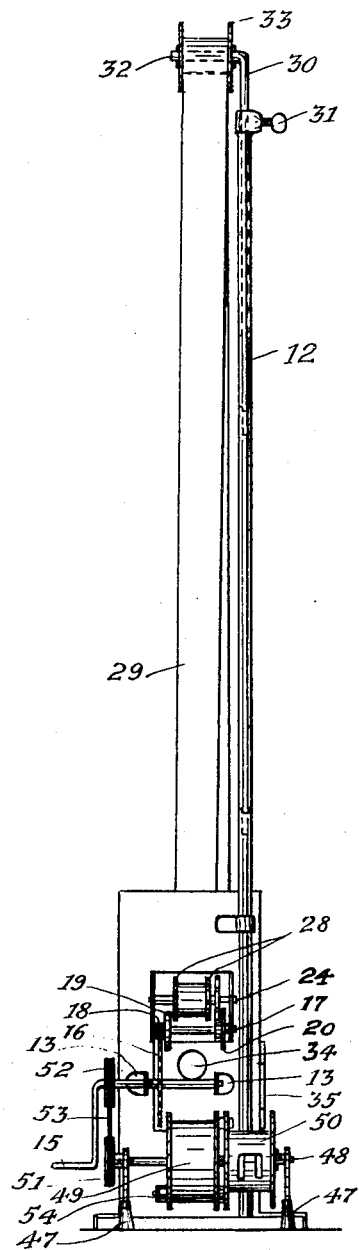
Witnesses:
Robert W. Muir
Theo. Lagaard
Inventor:
Robert C. Groh.
By F. A. Whiteley,
his Attorney.

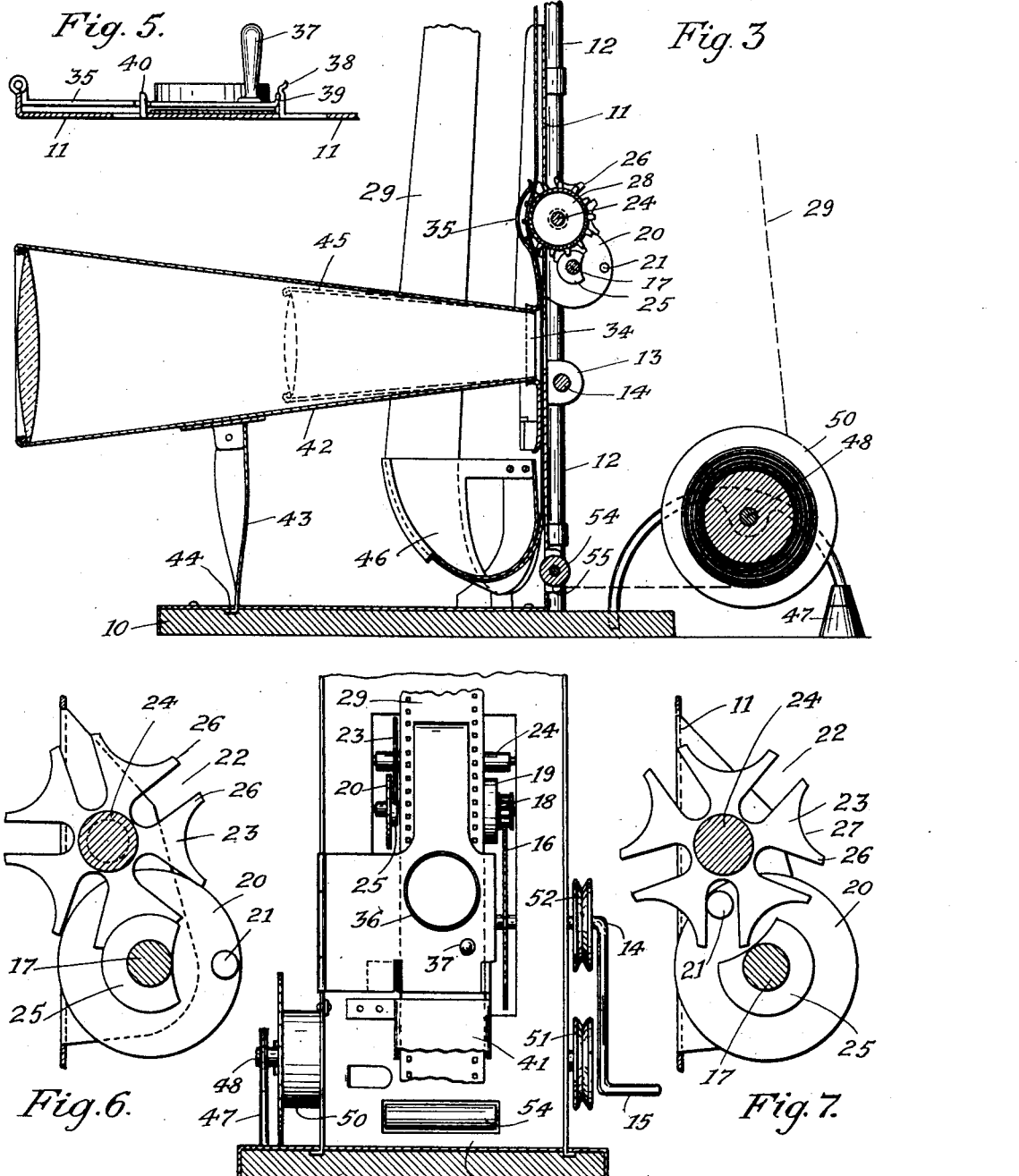

UNITED STATES PATENT OFFICE.

ROBERT C. GROH, OF ST. PAUL, MINNESOTA, ASSIGNOR OF ONE-HALF TO RUDOLPH STEINMETZ, OF MINNEAPOLIS, MINNESOTA.

MOVING-PICTURE MACHINE.

1,113,617. Specification of Letters Patent. Patented Oct. 13, 1914.

Application filed August 30, 1913. Serial No. 787,496.

*To all whom it may concern:*

Be it known that I, ROBERT C. GROH, a citizen of the United States, residing at St. Paul, in the county of Ramsey and State of Minnesota, have invented certain new and useful Improvements in Moving - Picture Machines, of which the following is a specification.

My invention relates to motion picture devices and has for its object to provide a machine for exhibiting motion pictures without the employment of any artificial light.

It is the object of my invention to provide a machine in which a picture film strip of the usual type, such as is employed in the commercial machines and from which the picture is projected by means of an artificial light, may be used and the same motion picture effect obtained directly from the film without the employment of any screen or projecting light. I accomplish this result by providing means for guiding and alternately moving and stopping in rapid succession a strip of such picture film across and in front of a frame-opening exposed at one side to the light of a room, such as a window, or lamp if in the evening. At the other side of the opening, and having the walls thereof leading directly thereto so that the successive pictures of the film will appear in natural position against the frame-opening at the bottom or end of the tube, I provide a magnifying eye-piece. This may be made in various forms, either small so as to be adapted to but a single eye, or enlarged so that both eyes of the observer may be used at the same time. I also contemplate the employment of dual glasses such as opera glasses or stereopticon glasses. In any event, the magnifying glasses will be mounted in a holder or tubular member having the walls thereof fitted to the frame-opening, so that as the operator actuates the mechanism provided to alternately move and stop the successive pictures of the film strip in front of the frame-opening he will be able to see said pictures through the magnifying glasses and will obtain the same motion picture effects as would be the case if the pictures were projected by artificial light upon a screen.

The full objects and advantages of my invention will appear in connection with the detailed description thereof and are particularly pointed out in the claims.

In the drawings, illustrating the application of my invention in one form,—Figures 1 and 2 are respective side and front elevations of an apparatus embodying the principles of my machine. Fig. 3 is an enlarged sectional elevation through the axis of the eye-piece. Fig. 4 is an enlarged rear view with some parts broken away, showing particularly the gate for holding the film in position while the same is being operated. Fig. 5 is a section across the machine showing a top of the said gate. Figs. 6 and 7 are detail views of the means for operating the film.

A base member 10 is provided having mounted thereon a standard 11 to which is attached an extended member 12 preferably divided into sections to permit its being taken down and packed in a small space. Journaled on standard 11 by means of brackets 13 is a shaft 14 to which is attached a handle 15 for rotating the same. Rigidly mounted upon shaft 14 adjacent its center is a gear wheel 16, and similarly mounted upon a shaft 17 is a gear wheel 18 which is operatively connected to and driven by gear wheel 16. A balance wheel 19 is mounted upon shaft 17 adjacent gear 18 for the purpose of producing a more steady motion. Upon the other extremity of shaft 17 is rigidly mounted a disk 20 having a pin 21 for engagement in the slots 22 of a star wheel 23 which is mounted on an adjacent shaft 24. A segment wheel 25 is integrally fastened to disk 20, segment wheel 25 being so constructed as to permit arms 26 of star wheel 23 to swing past segment 25 when star wheel 23 is operated by means of pin 21. Curved portions 27 on star wheel 23 are formed to accurately fit on segment 25 and lock star wheel 23 firmly in position until pin 21 engages in slot 22 to turn star wheel 23. It is clear that by this device shaft 17, by means of pin 21 engaging in one of the slots 22, rotates shaft 24 a fixed distance. Then pin 21 turns out of slot 22 and the star wheel is locked in its position until pin 21 engages with the next slot 22. By this means shaft 24 is intermittently rotated and held stationary. Rigidly mounted on shaft 24 are sprockets 28 which are provided for engaging the notched edges of a picture film strip 29.

The upper section of extended member 12 comprises a tube within which is slidably mounted a rod 30 which may be locked by means of a set screw 31 threaded into the upper part of the tube. Rod 30 has a portion 32 bent at right angles to the extended member 12. Rotatably mounted on portion 32 is a roller 33. Adjacent brackets 13 and preferably just above shaft 14 is a circular opening 34 in standard 11. Hingedly connected to the edge of standard 11 is a gate member 35 provided with an aperture 36 constructed to coincide with aperture 34 in standard 11. A handle 37 is provided to permit the ready opening and closing of gate 35. Spring member 38 engages over a lug 39 when the gate is in its closed position and serves to lock it in place. A guide lug 40 is provided opposite spring member 38. Just below gate member 35 is a guide plate 41 mounted on standard 11. To the opening 36 in gate 34 is attached a magnifying eye-piece 42 having its walls fitted tightly to said opening. Said eye-piece 42 is supported by means of a brace 43 which is so constructed as to permit its ready insertion into an aperture 44 in base member 10 in such a way as to hold the eye-piece 42 firmly positioned while in use and yet readily removable when necessary. A shorter eye-piece 45 may be provided if the device is used as a toy or if otherwise desired.

Film 29 may be either the ordinary film as used in the moving picture theaters, or it may be an endless strip, depending upon the use for which it is intended. When used in an endless strip the film passes over roller 33 down into a guide 46 which is mounted on the base 10 of the apparatus. Guide 46 receives the film 29 in a plane parallel with the axis of the eye-piece and turns and guides it in a plane perpendicular to the axis of the eye-piece so that film 29 passes across opening 34 by means of sprockets 28, goes up around roller 33 and passes down again through guide 46 and can thus be rotated indefinitely.

In case film 29 is an ordinary film a stand 47 is provided in which is journaled a shaft 48 having mounted thereon a loose pulley or spool 49 and a spool 50 keyed on the shaft 48. A sheave wheel 51 is rigidly mounted to one end of shaft 48 and a sheave wheel 52 is mounted on shaft 14. These sheave wheels are operatively connected by means of a belt 53 so that when handle 15 is turned, rotating shaft 14, sheave wheel 52 will rotate sheave wheel 51 through belt 53. A roller 54 is mounted at the bottom of standard 11 and an aperture 55 is there provided to permit the passage of film 29. The spools 49 and 50 herein used are the ordinary spools provided for motion picture films and have a spring clip for holding the end of same when winding up the film.

In the operation of my invention, when using the ordinary film the loaded spool is placed upon shaft 48, an empty spool is placed next to the loaded spool but is mounted so as to revolve with shaft 48. The end of the film 29 is passed over roller 54, gate 35 is swung open, and the end of the film is passed through the guards up to and placed upon the sprockets for driving the same and then is led directly over roller 33 and down on the other side and is fastened to the empty spool by the spring clip. The gate is then closed, the eye-piece replaced and the device is ready for operation. As the handle 14 is turned the film driving mechanism is actuated, and at the same time, by means of the sheave wheels, shaft 48 is rotated and used film 29 is wound on the empty spool 50. The structure of the film actuating mechanism itself is the same whether the regular film or the endless film is used. The sprocket wheels 28 which drive the film are in each case positively driven as they move the film from one exposure to the next, then are positively locked in position, and again positively move the film to the next exposure.

In loading my device with the endless film it is only necessary to place the film over roller 33, open the gate 35, place the film through guide 46, then up through guide 41, and into the sprocket wheels 28, and the gate can then be closed and the device operated as long as desired.

My device may be used in many different ways, and as daylight or ordinary artificial light alone is needed, the scope of my invention in use is much wider than that of the ordinary motion picture apparatus which requires special conditions of light.

My device can very readily be used as a toy, the endless picture film strips readily lending themselves to use in this connection. The films for use in this connection could be obtained readily from the film producing companies, as a great number of films are laid aside every day. When films have once been shown around the circuit of the moving picture theaters they are withdrawn and are no longer of value to their owners. These films could be obtained cheaply and used in the toy machines. The construction of the toy machine would of course be cheaper than that of the machine used in ordinary commercial lines, and the structure of my invention readily lends itself to this cheapness of construction. For example, the extended member can readily be fastened to the frame by means of clamps stamped out of the frame itself. When used as a toy, the eye-piece 45 could be used, thus cutting down the production cost.

The commercial uses to which my invention may be put are varied. It could be used by the film manufacturers in examining their films for defects. It could be used by those having in charge the censorship of plays, permitting them to give a moving picture film a much closer scrutiny than would be possible by means of the ordinary method of showing these films. It could be used by scientists in studying the various forms of life or the changing conditions in any object requiring close examination by them, as each exposure could be examined separately or all of them could be examined in their relation one to the other. Many other uses for my device in a commercial way will readily suggest themselves.

Owing to the fact that my device is simple and without the necessity of special fittings its construction is inexpensive. Owing to the fact that no especially prepared screen is necessary and that daylight or ordinary artificial light is used the operative cost of my machine is very low. It has many other advantages which are obvious.

I claim:

1. A motion picture machine comprising a frame having a display opening exposed at one side to daylight, a magnifying eye-piece having the walls thereof fitted to said opening and extending away from the light-receiving side thereof, a picture film strip, and means for guiding the same out of contact with the eye-piece and between the opening therefrom and the said frame opening.

2. A motion picture machine comprising a frame having a display opening exposed at one side to daylight, a magnifying eye-piece having the walls thereof fitted to said opening and extending away from the light-receiving side thereof, a roller carried by the frame at a point removed from the said frame-opening, a picture film strip running over said roller, a guide positioned adjacent the frame-opening for directing the film strip between the said frame-opening and the eye-piece, and means for moving and intermittently holding stationary said film strip.

3. A motion picture machine comprising an extended frame having guides at the opposite ends thereof and having an opening near one of said guides, a picture film strip running over said guides and across said opening, and a magnifying eye-piece having the walls thereof fitted to said opening and extending away from the light-receiving side thereof.

4. A motion picture machine comprising an extended frame having guides at the opposite ends thereof and having an opening near one of said guides, an endless picture film strip running over said guides and across said opening, and a magnifying eye-piece having the walls thereof fitted to said opening and extending away from the light-receiving side thereof.

5. A motion picture machine comprising an extended frame having guides at the opposite ends thereof and having an opening near one of said guides, an endless picture film strip running over said guides and across said opening, and a magnifying eye-piece having the walls thereof fitted to said opening and extending away from the light-receiving side thereof, said eye-piece being removable to permit framing and removal of the film strip.

6. A motion picture machine comprising an extended frame having guides at the opposite ends thereof and having an opening near one of said guides, a picture film strip running over said guides and across said opening, sprockets for holding and moving the film, a gate engageable with the film to hold the same in contact with the sprockets, a magnifying eye-piece removably secured to the gate and having the walls thereof fitted to the said frame-opening and extending away therefrom, and means to operate the sprockets.

7. A motion picture machine comprising an extended frame having a roller at one end thereof and a frame-opening adjacent the other end, an endless picture frame strip running over the roller, a magnifying eye-piece having the walls thereof fitted to the said opening and extending away from the light-receiving side thereof, and a guide below the eye-piece for receiving the film in a plane parallel with the axis of the eye-piece and turning and guiding the same between the frame-opening and the eye-piece in a plane perpendicular to the axis of the eye-piece.

8. A motion picture machine comprising an extended frame having a roller at one end thereof and a frame-opening adjacent the other end, an endless picture frame strip running over the roller, a magnifying eye-piece having the walls thereof fitted to the said opening and extending away from the light-receiving side thereof, a guide below the eye-piece for receiving the film in a plane parallel with the axis of the eye-piece and turning and guiding the same between the frame-opening and the eye-piece in a plane perpendicular to the axis of the eye-piece, and means for continuously moving and holding stationary the picture film through alternate fixed intervals of time.

9. A motion picture machine comprising an extended frame having an opening adjacent the bottom thereof, a roller at the top of said frame, a fixed guide adjacent the bottom of the frame on one side thereof and a pair of rollers on the other side of said frame, a magnifying eye-piece having the walls thereof fitted to the said frame-opening and extending outwardly from the light-receiving side thereof, a picture film strip extending across said frame-opening and over the said top roller, and means for operating said film strip to cause the same to travel either over the fixed guide or upon the bottom rollers as may be desired.

10. A motion picture machine comprising an extended frame having an opening adjacent the bottom thereof, a roller at the top of said frame, a pair of rollers mounted adjacent the bottom of the frame and a picture film strip extending from one of said rollers over the top roller across the frame-opening and to the other bottom roller, a magnifying eye-piece having the walls thereof fitted to the said frame-opening and extending outwardly from the light-receiving side thereof, and means for intermittently moving and holding stationary the film strip and for forwarding the same from one bottom roll and winding it up on the other bottom roll.

11. A motion picture machine comprising an extended frame having an opening exposed to light at one side, a magnifying eye-piece fitted to the said opening at the other side, a shaft journaled in the frame having thereon a star wheel, a pair of sprockets fast on the shaft, a picture film strip having the notched edges thereof engaged by said sprockets, and a disk having a pin thereon for engagement in the slots of the star wheel to move the said star wheel and shaft, and having a segment wheel thereafter engageable with curved portions formed on the points of the star wheel to hold the star wheel and shaft locked when the same is not being moved by the pin.

In testimony whereof I affix my signature in presence of two witnesses.

ROBERT C. GROH.

Witnesses:
ROBERT W. MUIR,
H. A. BOWMAN.